Figure 2:
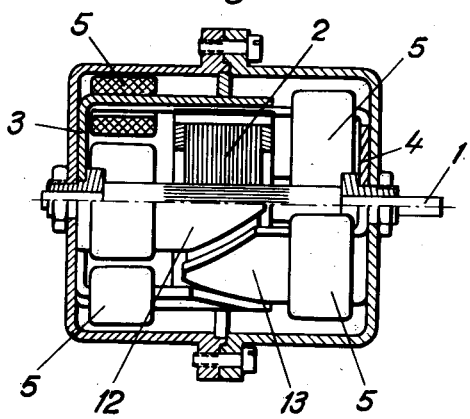

Jan. 15, 1952     W. H. PETERSÉN     2,582,652
ALTERNATING CURRENT MOTOR

Filed Aug. 4, 1949

Inventor
Wilhelm H. Petersén
By    Attorney.

Patented Jan. 15, 1952

2,582,652

UNITED STATES PATENT OFFICE 2,582,652

ALTERNATING CURRENT MOTOR

Wilhelm H. Petersén, Vasteras, Sweden, assignor to Allmanna Svenska Elektriska Aktiebolaget, Vasteras, Sweden, a Swedish corporation Application August 4, 1949, Serial No. 108,519
In Sweden September 3, 1948

2 Claims. (Cl. 172—275)

The increased use of small A. C. motors has led to considerable research on the problem of obtaining simple, easily manufactured types of such motors. Many constructions have been proposed which differ widely in shape from that of traditional A. C. machines. Usually the motors are manufactured as single-phase induction motors, with special starting means. The efficiency of these machines is usually very low, and they often suffer from the disadvantage that they develop maximum efficiency only within a very limited speed range. The starting torque is usually very low.

One object of the present invention is to provide an alternating current motor which has an extremely favorable efficiency curve.

In accordance with the present invention the motor is provided with two stator halves axially disposed one on each side of the rotor with triangularly pointed pole pieces protruding from each half of said stator to embrace and cover the peripheral surface of the rotor, the said pointed pole pieces of each of said stator halves extending between the corresponding pole pieces of the other stator half, and a magnetizing coil being provided on each of said pole pieces, the coils of one stator half being inter-connected to form poles of alternating polarity and the magnetizing system thus formed on one stator half being displaced in phase from the magnetizing system formed by the other stator half.

Several essential advantages may be obtained by means of the described construction. An almost ideal excitation curve for the motor can be obtained by an appropriate design of the protruding poles. The windings may suitably consist of ready-wound coils, mounted on the poles. By this means the excitation curve will attain practically a continuous shape, close to the ideal sine curve and without the step shape characteristic of slot wound machines. The material of the motor will be effectively utilised and the motor will develop a torque which is considerably higher than that developed by machines of corresponding types. This is due to the fact that the diameter of the rotor is large compared with the outside diameter of the motor itself. Moreover, the torque of the new machine is practically constant from stand-still to full speed, which constitutes an obvious advantage in comparison with earlier types with their extremely low starting torque. The excitation curve of the machine will retain its favourable shape even when a minimum number of poles is employed.

The rotor may either be of squirrel-cage type or may consist of a ring of permanent magnet steel in the case of a motor which is intended to operate as a synchronous motor.

Figure 1:
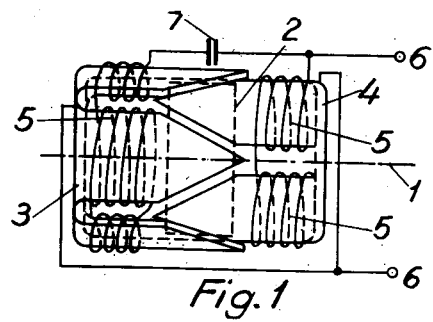
Figure 3:
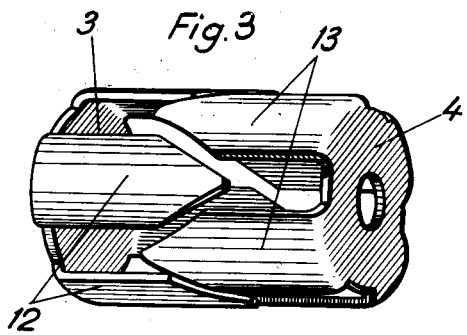

The drawings show one form of the alternating current motor, Fig. 1 being a diagrammatic elevation, Fig. 2 being a longitudinal section and Fig. 3 being a perspective view showing the arrangement of the active metal parts of the stator.

In the drawings the shaft of the machine is denoted by 1, the rotor by 2, and the two halves of the stator by 3 and 4. The stator halves are of similar shape, and each consists of stampings 3 and 4, made either from a single sheet or from laminations and are provided with protruding pole pieces 12 and 13 Figs. 2 and 3. The limbs forming the pole pieces 12, 13 on each stamping 3 and 4 are bent out at right angles. The protruding parts of each stator are pointed whereby it is possible to arrange the two stator halves 3 and 4 coaxially on each side of the rotor 2 so that the pointed pole pieces 12 of one stator half extend between the pole pieces 13 of the other half. In this way the periphery of the rotor will be enclosed by the triangular ends of the pole pieces as shown in the figures, each stator half having four protruding pole pieces which are bent out at right angles and formed in such a way as to form a cylindrical surface. On the inner rectangular part of each pole a ready-wound coil 5 is mounted, adapted to conform to the shape of the pole. The coils of each stator half are in series and connected to the A. C. network at 6, with one of the stator windings in series with a capacitor 7.

In motors having a larger number of poles than shown in the figures, the stator halves consist of star shaped stampings with the pointed pole pieces bent out at right angles.

The above mentioned forms refer to a motor with radial air-gaps, but the invention may equally well be applied to motors with axial air-gaps and an analogous arrangement of the stator parts.

I claim as my invention:

1. An alternating current motor comprising a rotor, two stator halves axially disposed one on each side of said rotor, triangularly pointed pole pieces protruding from said stator halves and embracing and covering the peripheral surface of said rotor, the said pointed pole pieces of each of said stator halves extending between the corresponding pole pieces of the other stator half, and a magnetizing coil on each one of said pole pieces, the coils of one stator half being interconnected to form poles of alternating polarity, and the magnetizing system thus formed on one stator half being displaced in phase from the magnetizing system formed by the other stator half.

2. An alternating current motor comprising a rotor, two stator halves axially disposed one on each side of said rotor, pole pieces having parallel edges and triangularly pointed extremities protruding from said stator halves and embracing and covering the peripheral surface of said rotor, the said pointed extremities of the pole pieces of each of said stator halves extending between the corresponding extremities of the pole pieces of the other stator half, and a magnetizing coil on the parallel edged portion of each one of said pole pieces, the coils of one stator half being inter-connected to form poles of alternating polarity, and the magnetizing system thus formed on one stator half being displaced in phase from the magnetizing system formed by the other stator half.

WILHELM H. PETERSÉN.

REFERENCES CITED

The following references are of record in the file of this patent:

UNITED STATES PATENTS

| Number | Name | Date |
|---|---|---|
| 2,070,447 | Morrill | Feb. 9, 1937 |
| 2,212,192 | Howell | Aug. 20, 1940 |
| 2,405,012 | Bousky | July 30, 1946 |
| 2,432,573 | Jorgensen | Dec. 16, 1947 |

FOREIGN PATENTS

| Number | Country | Date |
|---|---|---|
| 373,700 | Great Britain | June 2, 1932 |
| 394,784 | Great Britain | July 6, 1933 |